(12) United States Patent
Jiang et al.

(10) Patent No.: US 8,538,741 B2
(45) Date of Patent: Sep. 17, 2013

(54) APPARATUS AND METHOD FOR PARTITIONING A DISPLAY SURFACE INTO A PLURALITY OF VIRTUAL DISPLAY AREAS

(75) Inventors: Yinan Jiang, Toronto (CA); Shahriar Pezeshgi, Richmond Hill (CA); Ming-Wei Chien, North York (CA)

(73) Assignee: ATI Technologies ULC, Markham, Ontario (CA)

( * ) Notice: Subject to any disclaimer, the term of this patent is extended or adjusted under 35 U.S.C. 154(b) by 849 days.

(21) Appl. No.: 12/638,941

(22) Filed: Dec. 15, 2009

(65) Prior Publication Data

US 2011/0144970 A1 Jun. 16, 2011

(51) Int. Cl.
*G06F 9/455* (2006.01)
*G06F 13/10* (2006.01)

(52) U.S. Cl.
CPC .................................. *G06F 13/105* (2013.01)
USPC .............................................. 703/24; 703/23

(58) Field of Classification Search
USPC ................ 703/23–24; 345/1.1, 1.3, 531, 538
See application file for complete search history.

(56) References Cited

U.S. PATENT DOCUMENTS

| | | | |
|---|---|---|---|
| 6,445,400 B1* | 9/2002 | Maddalozzo et al. | 715/803 |
| 7,010,755 B2* | 3/2006 | Anderson et al. | 715/778 |
| 7,136,042 B2 | 11/2006 | Magendanz et al. | |
| 7,477,205 B1 | 1/2009 | de Waal et al. | |
| 7,561,116 B2 | 7/2009 | Westerinen et al. | |
| 2010/0321395 A1* | 12/2010 | Maciesowicz et al. | 345/502 |

OTHER PUBLICATIONS

Canadian Patent Office Search Report; International Application No. PCT/CA2010/001966; dated Mar. 2, 2011.

\* cited by examiner

*Primary Examiner* — Eunhee Kim
(74) *Attorney, Agent, or Firm* — Faegre Baker Daniels LLP

(57) ABSTRACT

A method and apparatus that partitions a single display's viewable area into at least two virtual viewable areas, and emulates the at least two virtual viewable areas as at least two emulated physical displays with an operating system such that the operating system behaves as if interfacing with at least two actual independent physical displays. The method provides the operating system with generated display identification data (such as "EDID") for each of the emulated physical displays in response to a query from the operating system. The method and apparatus also receive notification of an interrupt (where the interrupt corresponds to the single physical display), and reports to the operating system with at least two sets of interrupt reporting information, corresponding to the at least two emulated physical displays, as if two interrupts were received. The operating system is thereby "faked" into acting as if two physical displays are in operation.

30 Claims, 15 Drawing Sheets

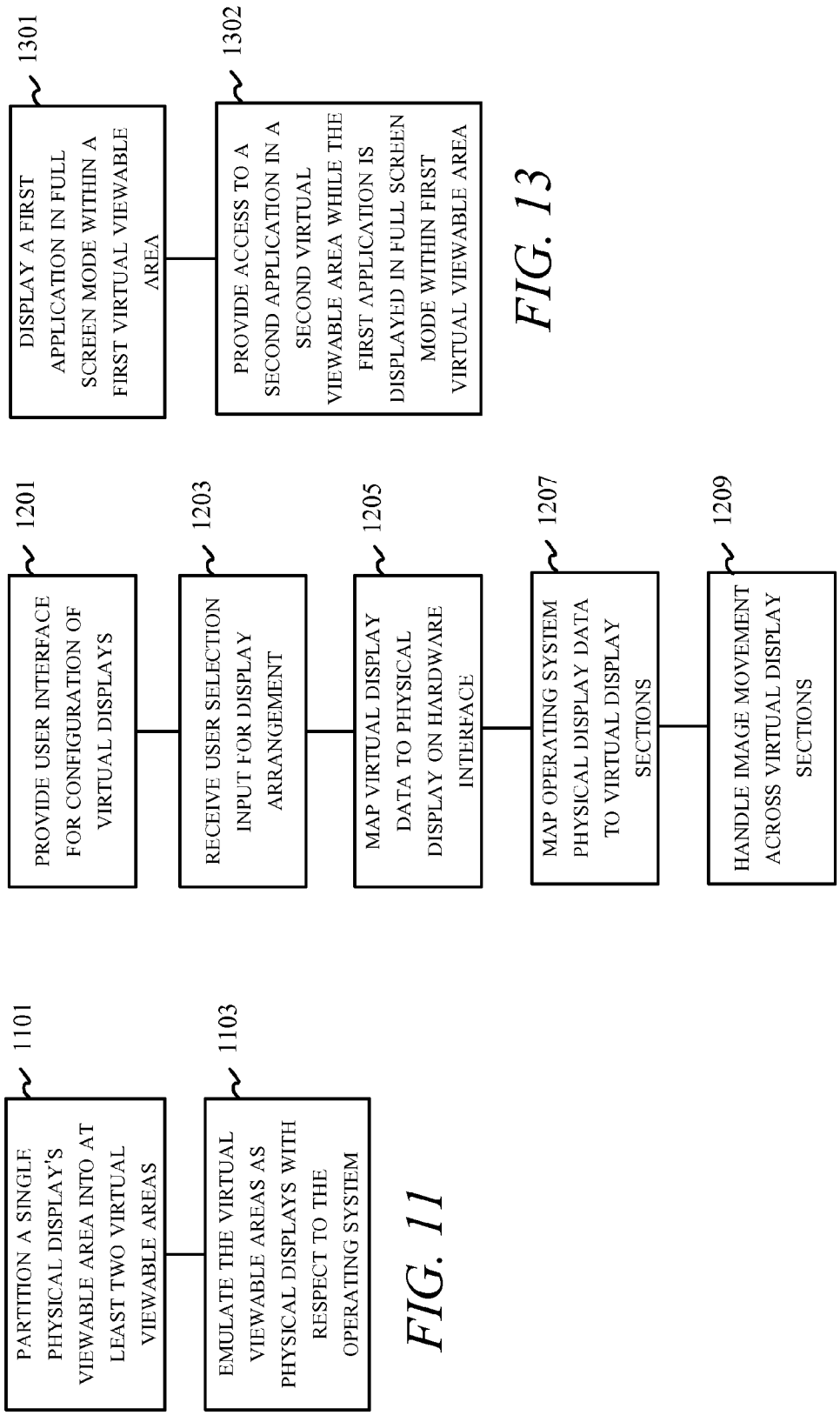

APPARATUS AND METHOD FOR PARTITIONING A DISPLAY SURFACE INTO A PLURALITY OF VIRTUAL DISPLAY AREAS

FIELD OF THE DISCLOSURE

The present disclosure is related to displays and to partitioning the display surface of a single physical display into multiple virtual displays.

BACKGROUND

It is convenient to have the capability to split a display surface into multiple sections in order to monitor given applications. For example, a user may wish to have an application running in one portion of a display and have an Internet chat application running in another partition. In this manner, a user may engage in an online gaming application while running a chat session with one or more fellow gamers or other friends. In another example, a user may wish to run a primary application in one partition while continuing to monitor other items, such as stock quotes, news, etc.

Some utilities exist that allow a user to create partitions. Unfortunately, application settings trump the partitions and render such existing utilities unable to accommodate certain use case scenarios. For example, when an application is run in a "full screen mode," that is, where the application window would normally extend across the full area of the actual display surface, the application will cover over any set partitions such that any other applications are no longer viewable. In other words, application settings such as full screen mode trump any display partition settings created by existing partition utilities.

Therefore a need exists for apparatuses and methods that can partition a display surface without interference from applications such that an application running in full screen mode would stay within a set partition and not interfere with other applications displayed in other partitions.

BRIEF DESCRIPTION OF THE DRAWINGS

FIG. 11 is a flow chart illustrating high level operation of the various embodiments.

FIG. 12 is a flow chart illustrating high level operation of the various embodiments.

FIG. 13 is a flow chart illustrating high level operation of the various embodiments when an application is operated in full screen mode.

DETAILED DESCRIPTION

Figure 1:
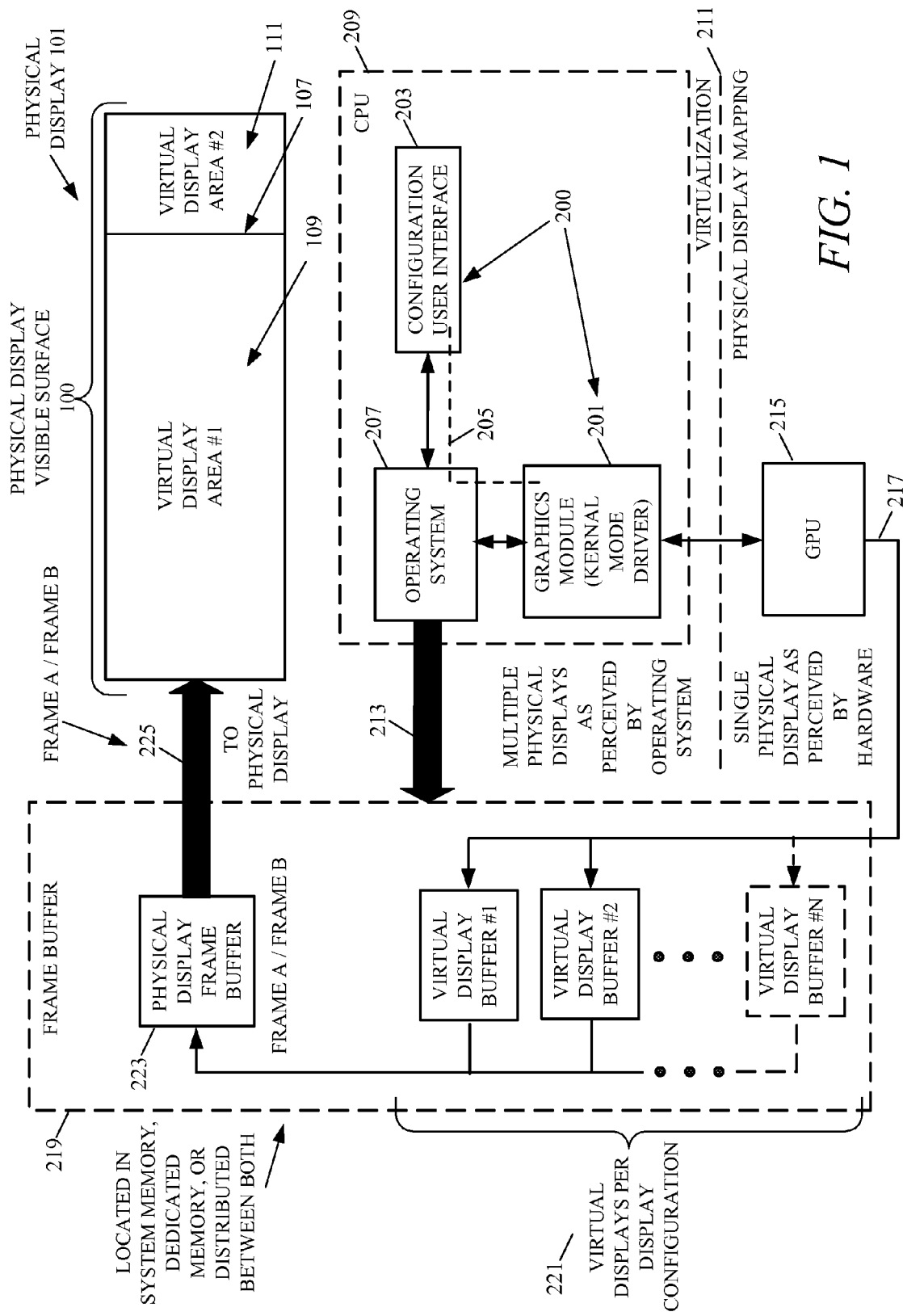
FIG. 1 is a block diagram of an apparatus in accordance with the embodiments.

The present disclosure provides a method that includes partitioning a single display's viewable area into at least two virtual viewable areas, and emulating the at least two virtual viewable areas as at least two emulated physical displays with an operating system such that the operating system behaves as if interfacing with two actual physical displays. The method accomplishes the emulation of the at least two emulated physical displays in various ways. For example, the method provides to the operating system, generated display identification data (such as EDID, "extended display identification data") for each of the emulated physical displays in response to a query from the operating system for display information.

In another example, the method emulates the at least two emulated physical displays by receiving notification of an interrupt from a graphics processing unit, (where the interrupt corresponds to the single physical display), and reporting to the operating system with at least two sets of interrupt reporting information, corresponding to the at least two emulated physical displays, as if two interrupts were received. The operating system is thereby "faked" into acting as if two physical displays are in operation.

The method further provides for displaying a first application window in full screen mode within one virtual viewable area, emulated as a physical display, of the at least two virtual viewable areas, where the application in full screen mode expands only within a perimeter of the one virtual viewable area. The method may further include displaying a second application window within another virtual viewable area, emulated as another physical display, of the at least two virtual viewable areas, while the first application is displayed in full screen mode within the one virtual viewable area, and continuing to display the first application in full screen mode while the second application window is accessed, for example, placed into focus.

The method includes a double buffering method for composing display data frames where each data frame includes data from both of the at least two virtual viewable areas. The method includes sending the display data frames to the single display. The method may also include determining that display data displayed within a first virtual viewable area of the at least two virtual viewable areas has changed, and copying display data from a second virtual viewable area of the at least two virtual viewable areas in a first display data frame.

The method may also include receiving selection input corresponding to a display configuration that partitions the single display's viewable area into the at least two virtual viewable areas. In this embodiment, the method partitions the single display's viewable area, into at least two virtual viewable areas, in response to the selection input.

The method may also, in some embodiments, emulate the at least two virtual viewable areas as at least two emulated physical displays, by receiving notification from the operating system, of buffered data ready for display on one of the at least two emulated physical displays, determining that display data on a first emulated physical display of the at least two emulated physical displays has changed, copying display data for a second emulated physical display for which display data did not change but not in the first data frame, of the at least two emulated physical displays, into a first data frame and setting a flag as completed in the first data frame for the first and second emulated physical display, and setting a flag as not completed for the first emulated physical display in a second data frame. The method of emulating may also include receiving notification from the operating system, of buffered data ready for display on one of the at least two emulated physical displays, determining that display data on a second emulated physical display of the at least two emulated physical displays has changed, copying display data for both the first, for which display data did not change but not in second data frame, and a second, emulated physical display of the at least two emulated physical displays, into a second data frame and setting a flag as completed in the second data frame for the first and second emulated physical display, and setting a flag as not completed for the second emulated physical display in a first data frame.

The method may also include cursor control, for example, receiving a notification corresponding to a cursor position, determining an emulated physical display of the at least two emulated physical displays upon which the cursor is located, and converting the cursor's relative position, relative to the emulated physical display upon which the cursor is located, to a physical position corresponding to an overall display surface of the single display.

The embodiments disclosed also provide an apparatus that has at least one programmable processor, and memory operatively coupled to the programmable processor. The memory contains executable instructions for execution by the at least one processor. When the at least one programmable processor executes the executable instructions, the programmable processor is operable to partition a single display's viewable area into at least two virtual viewable areas, and emulate the at least two virtual viewable areas as at least two emulated physical displays with an operating system such that the operating system behaves as if interfacing with two actual physical displays.

The apparatus' at least one programmable processor, upon executing the executable instructions, may also be operable to emulate the at least two virtual viewable areas as at least two emulated physical displays by providing to the operating system, generated display identification data for each of the at least two emulated physical displays in response to a query from the operating system for display information. The at least one programmable processor may also be operable to emulate the at least two emulated physical displays by receiving notification of an interrupt from a graphics processing unit of the apparatus, where the interrupt corresponds to the single display, and reporting to the operating system with at least two sets of interrupt reporting information, corresponding to the at least two emulated physical displays, as if two interrupts were received.

The apparatus may also include a display operable to display a first application window in full screen mode within one virtual viewable area of the at least two virtual viewable areas, where the application window in full screen mode expands only within a perimeter of the one virtual viewable area. The display may further display a second application window within another virtual viewable area of the at least two virtual viewable areas, while the first application is displayed in the full screen mode within the one virtual viewable area. The display will then continue to display the first application window in the full screen mode while the second application window is accessed, for example, placed into focus.

The at least one programmable processor of the disclosed apparatus may also compose display data frames where each data frame includes data from both of the at least two virtual viewable areas. The display data frames are sent to the single display. The at least one programmable processor may also determine that display data displayed within a first virtual viewable area of the at least two virtual viewable areas has changed, and copy display data from a second virtual viewable area of the at least two virtual viewable areas in a first display data frame.

In some embodiments a user interface is also provided for configuration of the split displays and selecting how the virtual display areas are arranged. Therefore the at least one programmable processor of the apparatus may also be operable to receive selection input corresponding to a display configuration that partitions the single display's viewable area into the at least two virtual viewable areas. The single display's viewable area is then partitioned into at least two virtual viewable areas in response to the selection input.

In some embodiments the at least one programmable processor of the apparatus may be operable to emulate the at least two virtual viewable areas as at least two emulated physical displays by receiving notification from the operating system, of buffered data ready for display on one of the at least two emulated physical displays, determining that display data on a first emulated physicals display of the at least two emulated physical displays has changed, copying display data for a second emulated physical display of the at least two emulated physical displays, for which display data did not change, into a first data frame and setting a flag as completed in the first data frame for the second emulated physical display, and setting a flag as not completed for the second emulated physical display in a second data frame.

The programmable processor may also be operable to emulate the physical displays by receiving notification from the operating system, of buffered data ready for display on one of the at least two emulated physical displays, determining that display data on a first emulated physical display of the at least two emulated physical displays has changed, copying display data for both the first emulated physical display and a second emulated physical display of the at least two emulated physical displays, for which display data did not change but not in first data frame, into a first data frame and setting a flag as completed in the first data frame for the first and second emulated physical display, and setting a flag as not completed for the first emulated physical display in a second data frame. The programmable processor may also be operable to emulate the physical displays by receiving notification from the operating system, of buffered data ready for display on one of the at least two emulated physical displays, determining that display data on a second emulated physical display of the at least two emulated physical displays has changed, copying display data for the second emulated physical display of the at least two emulated physical displays, for which display data did change, and the first emulated physical display for which display data did not change but not in second data frame, into a second data frame and setting a flag as completed in the second data frame for the first and second emulated physical display, and setting a flag as not completed for the second emulated physical display in a first data frame.

The at least one programmable processor may also be operable to enact cursor control including receiving a notification corresponding to a cursor position, determining an emulated physical display of the at least two emulated physical displays upon which the cursor is located, and converting the cursor's relative position, relative to the emulated physical display upon which the cursor is located, to a physical position corresponding to an overall display surface of the single display.

The present disclosure further provides a computer readable memory, that includes executable instructions for execution by at least one processor, that when executed cause the at least one processor to perform the operations and methods in accordance with the embodiments as outlined above. For example, the executable instructions, when executed, may cause the at least one processor to partition a single display's viewable area into at least two virtual viewable areas, and emulate the at least two virtual viewable areas as at least two emulated physical displays with an operating system such that the operating system behaves as if interfacing with two actual physical displays.

The computer readable memory may be any suitable non-volatile memory such as, but not limited to programmable chips such as EEPROMS, flash ROM (thumb drives), compact discs (CDs) digital video disks (DVDs), etc., that may be used to load executable instructions or program code to other processing devices or electronic devices such as those described in further detail herein below.

The term "module" as used herein may include software and/or firmware executing on one or more programmable processors, ASICs, DSPs, hardwired logic or combinations thereof, and may be present within an electronic device/apparatus and/or within a display device.

Turning now to the drawings wherein like numerals represent like components, FIG. 1 illustrates an apparatus or electronic device in accordance with the embodiments. The apparatus may be, for example, a laptop computer, desktop computer, handheld electronic device such as, but not limited to, a mobile telephone, a book reader, a PDA, etc., or any such electronic device that makes use of a display whether the display is external to the electronic device or integrated within the electronic device. The apparatus of FIG. 1 includes a central processing unit, CPU 209, and a graphics processing unit, GPU 215, operatively coupled to the CPU 209. The CPU 209 includes an operating system 207 and a graphics module 201 operatively coupled to the operating system 207. The graphics module 201 may, in some embodiments, be implemented as a kernel mode driver. The operating system 207 is also operatively coupled to a configuration user interface 203 which also may be executing on the CPU 209. The configuration user interface 203 together with the graphics module 201 forms a split display system 200. The CPU 209 and GPU 215 may, in the various embodiments, be implemented in various ways. For example, the CPU and GPU may include one or more processing cores and may be physically located on separate integrated circuits and may even be located on separate printed circuit boards. However, in some embodiments, the CPU 209 and GPU 215 may be integrated circuits integrated on a single integrated circuit die. The CPU and GPU may share a system memory which may also be physically located externally from the CPU and GPU, or on the same die or printed circuit board with the CPU and GPU.

The system memory may include the frame buffer 219. However, in some embodiments the GPU 215 may have a dedicated memory and may contain the frame buffer 219. In yet other embodiments, the frame buffer 219 may be distributed between the GPU 215 dedicated memory and a system memory shared by the CPU 209 and the GPU 215. Therefore, in accordance with the embodiments, the frame buffer 219 may be stored in any appropriate memory whether it be system memory or dedicated memory such as the GPU 215 dedicated memory. The frame buffer 219 includes two primary portions, a virtual display buffer set 221 and a physical display frame buffer 223. The operating system 207 provides a logical interface 213 to the frame buffer 219, however the actual physical data transfer occurs between the GPU 215 and the frame buffer 219 via the interface 217. In accordance with the embodiments, the GPU 215 provides data to the virtual display buffer set 221 where the virtual display buffers each correspond to a virtual display area of a physical display such as physical display 101. The data provided by the virtual buffers 221 to the physical display frame buffer 223 is display data, that is, display data that corresponds to the virtual displays. The physical display buffer 223 buffers the display data and sends the display data to the physical display 101 for display in the virtual display areas 109 and 111. The physical display buffer 223 is segmented into two frames, frame A and frame B, where each of the frames A and B contain display data from both of the virtual displays. That is, frame A will contain display data for virtual display area #1 and for virtual display area #2. Likewise frame B will contain display data for virtual display area #1 and for virtual display area #2.

Physical display 101 is a display device and may be, for example, a television, computer monitor, or a display that is integrated into another electronic device such as a laptop computer, handheld computing device, mobile telephone, PDA, etc. The display device may be, for example, a CRT, LCD flat panel, LED flat panel, plasma screen, etc., that is, any appropriate display technology. The physical display 101 is operatively coupled to the GPU 215, and is also operatively coupled to the CPU 209 (for example via the GPU 215). The physical display 101 is operable to display information and images related to applications and/or electronic files of various file types such as, but not limited to, JPG/JPEG, GIF, MPEG, etc., and/or files that are determined by a file "extension" such as, but not limited to, ".doc," ".pdf," etc. The physical display 101 may include memory and/or logic that enables the adjustment, or configuration, of image quality settings related to images displayed on its screen space. The physical display 101 includes the capability of receiving and responding to queries for information such as, but not limited to, "EDID" information ("extended display identification data").

As shown near the top of FIG. 1, a physical display 101 includes a physical display visible surface 100. In accordance with the embodiments, the physical display visible surface 100 is partitioned via a boundary 107, into a virtual display area #1 109 and a virtual display area #2 111. The virtual display areas are therefore partitioned portions of the physical display 101 viewable surface area. The virtual display areas may also be considered as corresponding to "virtual displays," that is, emulated physical displays as will be described further. The two virtual display areas each have a corresponding virtual display buffer, that is virtual display buffer #1 and virtual display buffer #2, respectively. Although in the example embodiment illustrated in FIG. 1, the physical display visible surface 100 is partitioned into only two virtual display areas, the physical display visible surface 100 may be partitioned into any desired number of virtual display areas in accordance with the embodiments. Therefore the frame buffer 219 may have 1 through N virtual display buffers within the virtual display buffer set 221. As shown in FIG. 1, the virtual display buffer set 221 is determined per the display configuration. As mentioned above, the display configuration may be user determined using the configuration user interface 203. The virtual display buffer set 221 provides display data to the physical display frame buffer 223 which consolidates the virtual display buffer data into single frames of display data and provides them to the physical display 101 via an interface 225.

In accordance with the various embodiments, the graphics module 201 provides a virtualization with respect to the CPU 209 and a physical display mapping with respect to the GPU 215 as illustrated by the logical virtualization/physical display mapping boundary 211. In operation, the operating system 207 via the logical interface 213, perceives the virtual display areas 109 and 111 as multiple physical displays operatively coupled to the CPU. However, from the perspective of the GPU 215, only a single physical display, that is the physical display 101, is present and operatively coupled to the overall system. The graphics module 201 interfaces between the operating system 207 and GPU 215 to handle interrupts and provide information therebetween such that the operating system acts as if it is interacting with multiple physical displays. The interaction between the graphics module 201 and the GPU 215 enables the GPU to act normally as if only a single physical display is connected, which in fact is the case, however information from the virtual display areas is converted back to information corresponding to the physical display visible surface 100 of the physical display 101 so that this information can be provided to the GPU 215. In other words, the physical display mapping portion of logical boundary 211 is the interface between the graphics module 201 and the GPU 215.

Figure 2:
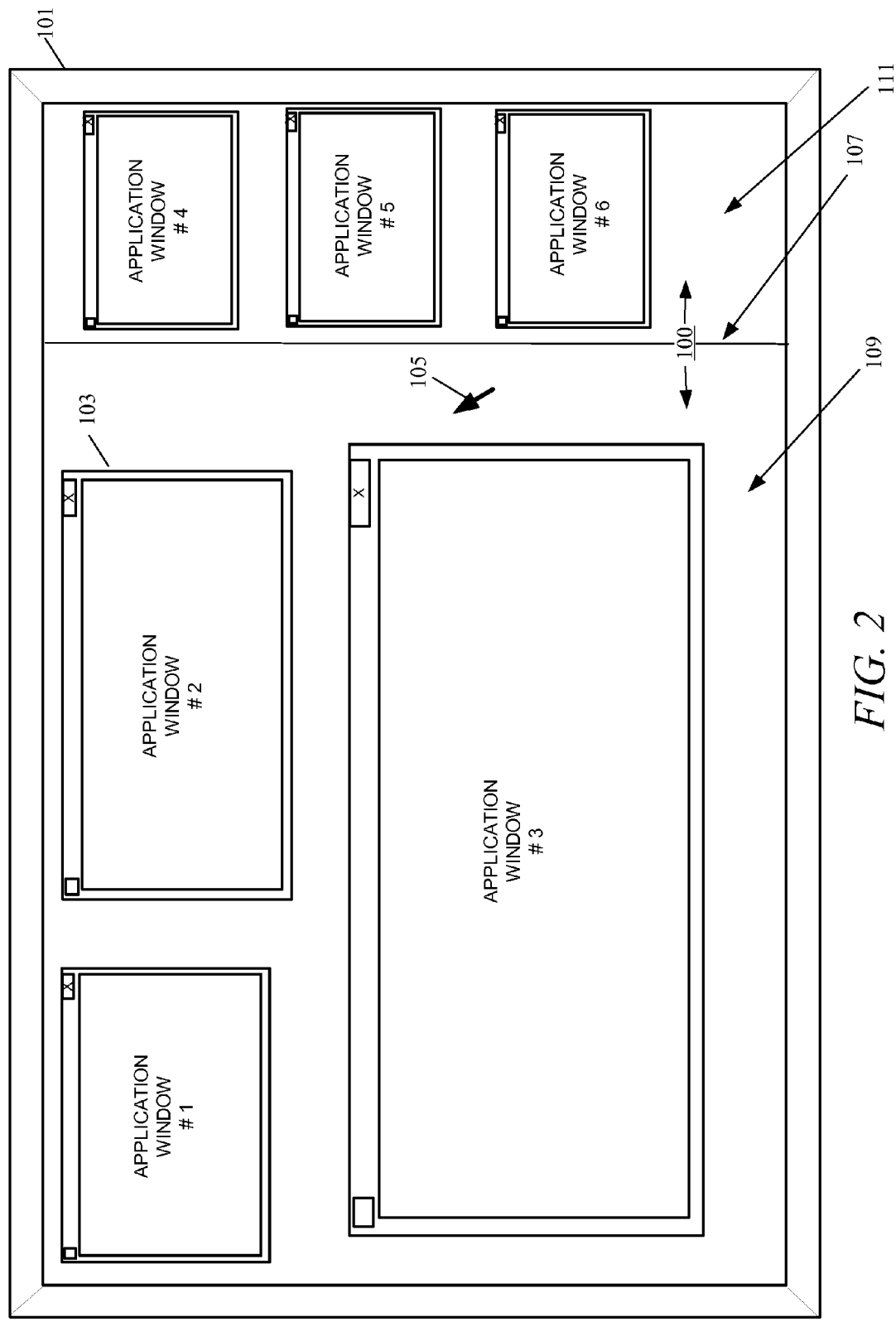
FIG. 2 is a diagram of a display surface having two virtual display partitions in accordance with an embodiment.
Figure 3:
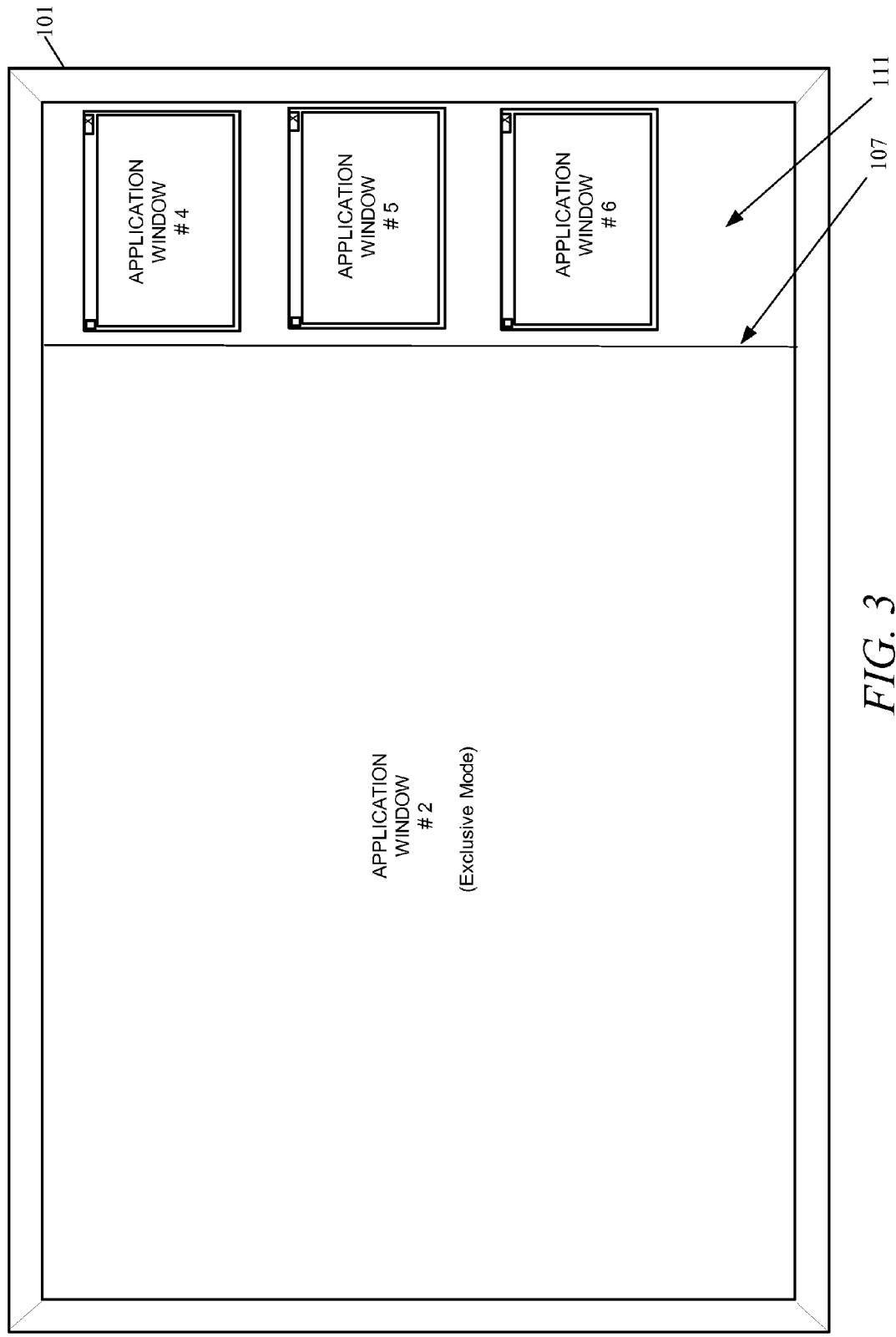
FIG. 3 is a diagram of a display surface having two virtual display partitions where one of the applications is operated in full screen mode without interfering with the other virtual display partition in accordance with an embodiment.

The following figures, FIG. 2 through FIG. 6, are useful for understanding the operation of the various embodiments. For example, FIG. 2 illustrates how the physical display 101 physical display visible surface 100 is partitioned into two virtual display areas 109 and 111. The virtual display areas are defined by the vertical boundary 107. As shown in FIG. 2, various application windows may be shown and operating within the various virtual display areas. For example, virtual display area 109 is shown having application windows 103 such as application windows 1 through 3 while virtual display area 111 is shown having application windows 4 through 6. Also shown in FIG. 2 is a mouse cursor 105 which is handled by the methods and apparatuses described herein and will be described in further detail below. Turning to FIG. 3, application window 2 is shown in a full screen mode, which, in this example, is an "exclusive mode." That is, application window 2 has been expanded to take up the entire display area or screen space of the virtual display area 109, and does not show any borders. However, unlike prior partitioning utilities, the various embodiments herein disclosed enable the application window #2 to be in full screen mode within the virtual display area 109 without interfering or covering over the other virtual display area 111. Therefore as shown in FIG. 3, application windows 4 through 6 which are present within the virtual display area 111 may still be viewed and may also still be put into focus and operated upon by the user while the application window #2 is in full screen mode within the first virtual display area 109. Placing a window into focus includes, for example, an operation whereupon a computing device or electronic device user selects, usually by moving a mouse cursor over an area on a screen space and clicking, that is, "selecting," an application window in order to view that information displayed within the application window, or to proceed with some other operation related to the application or the application window (such as, but not limited to, resizing or moving the application window). In another example, an application window may also be placed in a full screen mode where the application window borders as still shown, and extend along the periphery of the virtual display area. In this case, the application window will also not interfere with the neighboring virtual display area or with any applications displayed in the neighboring virtual display area. That is, full screen mode" may be for example, either "exclusive mode" as used, for example, in gaming (or other) applications where the application screen fills the viewable area of the display and has no borders, or a full screen windows application where an application window is extended fully within the viewable area of the display but may still show a border around the perimeter of the application window.

Figure 4:
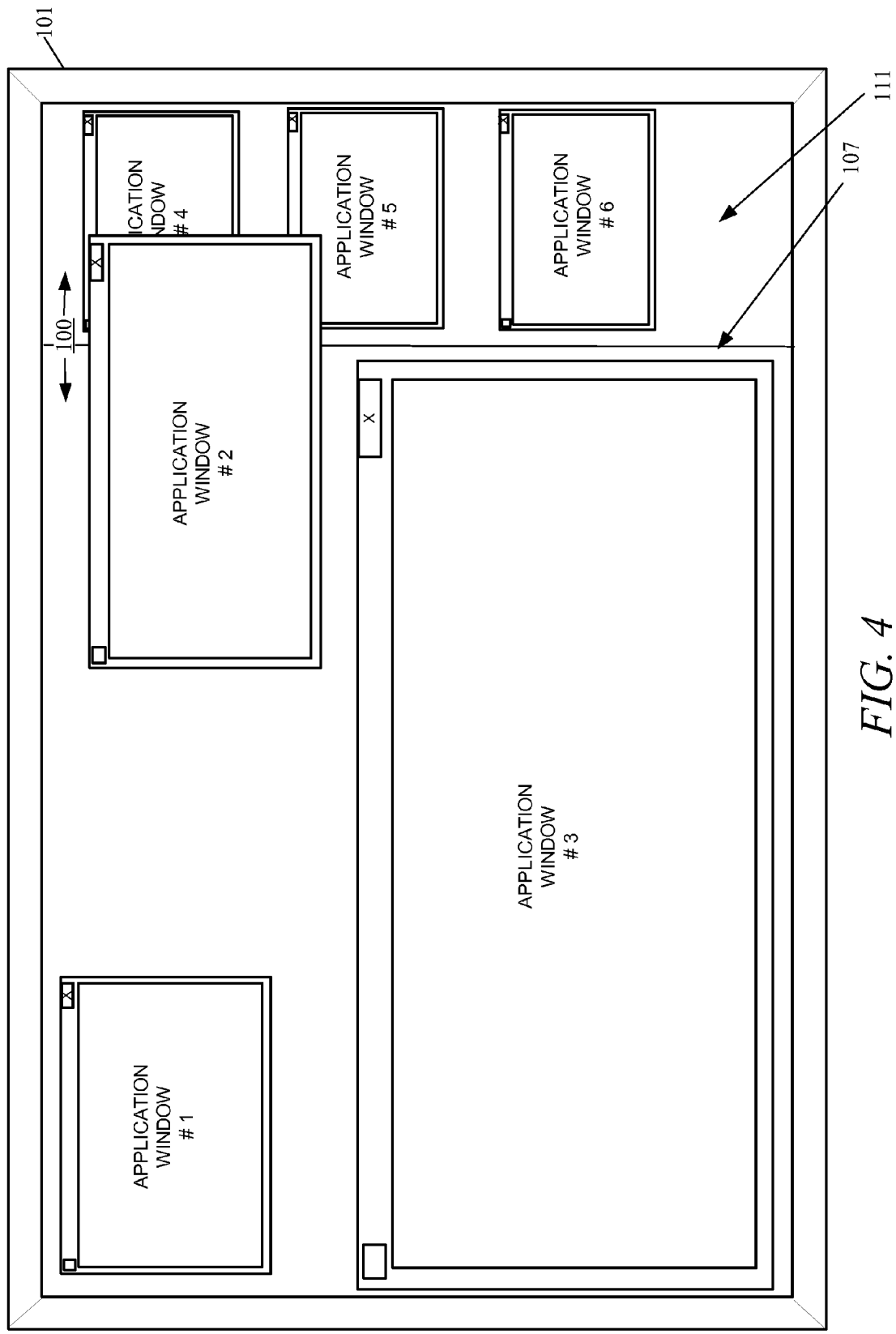
FIG. 4 is a diagram of a display surface having two virtual display partitions where one of the application windows is moved across the virtual display boundary in accordance with an embodiment.

FIG. 4 illustrates further capabilities of the various embodiments. In FIG. 4 application window 2 is shown being moved partially across, or between, the two virtual display areas 109 and 111. As can be seen from FIG. 4, movement of the application window #2 into the virtual display area 111 does not interfere with operation of the various application windows within the virtual display area 111. The apparatus illustrated in FIG. 1 performs the necessary translations between the operating system 207 and the GPU 215. That is, the graphics module 201 takes appropriate action for transitions of an object, such as the application window #2, across the boundary 107 so that the GPU 215 receives the appropriate physical display mapping and the operating system 207 receives the appropriate information suitable for the two emulated physical displays corresponding to virtual display areas 109 and 111.

Figure 5:
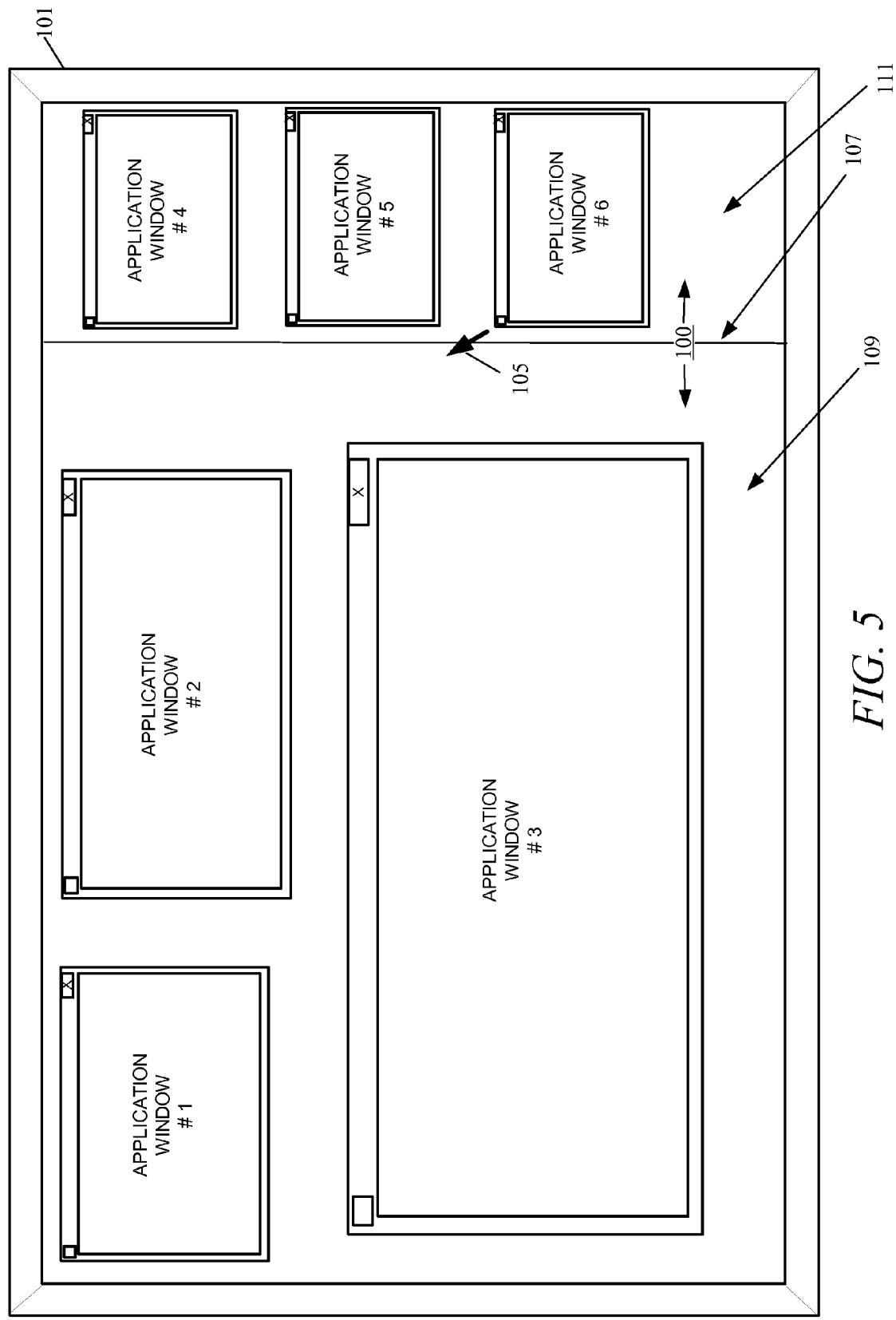
FIG. 5 is a diagram of a display surface having two virtual display partitions where the cursor is moved across the virtual display boundary in accordance with an embodiment.

FIG. 5 illustrates a scenario where the mouse cursor 105 moves between the two virtual display areas 109 and 111. In FIG. 5 the cursor 105 is shown across the boundary 107 as it is moved from one virtual display area to the other virtual display area. The various embodiments likewise handle such mouse cursor movement scenarios as will be discussed further herein.

Figure 6:
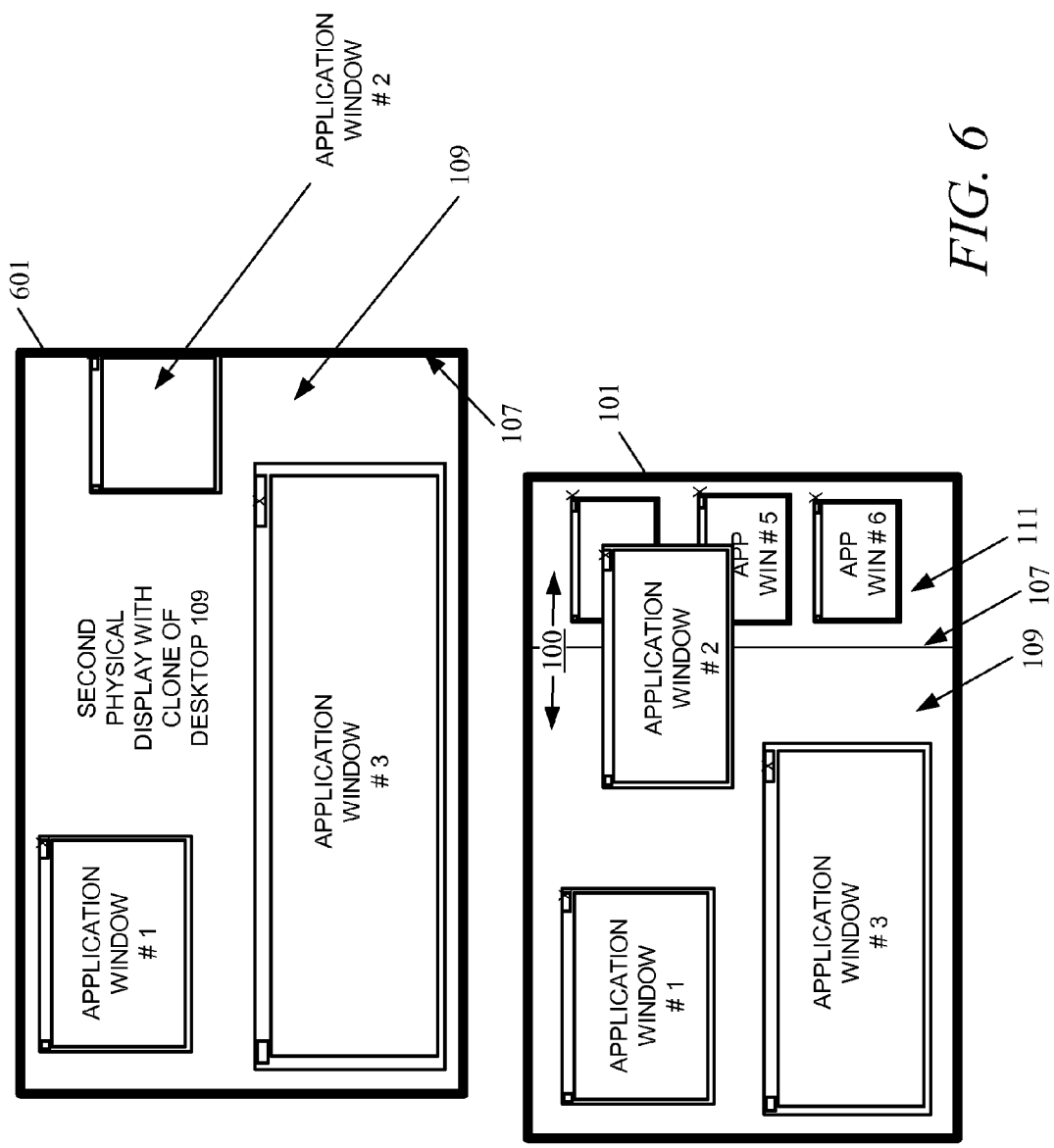
FIG. 6 is a diagram of a display surface having two virtual display partitions and where a second display provides a clone of one of the virtual display partitions in accordance with an embodiment.

Another use case scenario is illustrated by FIG. 6. In FIG. 6, the physical display 101 is used in conjunction with a second physical display 601. The second physical display 601 includes a clone of the desktop or virtual display area 109 shown on physical display 101. As shown in FIG. 6 the application window #2 on physical display 101 may move across the virtual display area boundary 107. However with respect to the clone of virtual display area 109 shown on physical display 601, the virtual display area boundary 107 on physical display 101 corresponds to the end of the actual physical display visible surface of physical display 601 so that the application window #2 moves off of the visible display area, that is, outside the monitor bezel.

The operation of the various embodiments, and how the embodiments handle the various scenarios illustrated in the previous figures, is best understood by the flow charts provided in FIG. 7 through FIG. 15 which will now be discussed.

In order to accomplish the operations of the various embodiments, the graphics module 201 performs various display management tasks including, target management EDID management, connection management, mode list management, display property management, and reverse topology management, which is management of interrupts such as, for example, Vsync interrupts. The other tasks that the graphics module must perform in accordance with the embodiments are related to rendering management. Therefore the graphics module in accordance with the embodiments must perform among other things, display rendering detection, displayable frame composition, and resource management, including frame buffer, command buffer and composition context management, and cursor management. Thus the graphics module 201 maintains one or more virtual displays which are derived from the physical display 101 and reports information related to the virtual displays to the operating system 207. The virtual displays, or rather the emulated physical displays corresponding to the virtual display areas, are given the same attributes as a real physical display, for example EDID, connectivity, video output type and interrupts. The graphics module 201 may reserve a dedicated memory block, in system memory or in dedicated memory, as a swap chain for the final image which will be shown on the physical display 101. The graphics module 201 forces the emulated physical displays to share the same synchronization signal (Vsync) with the physical display 101.

For example, in some embodiments the graphics module 201 may interact with the desktop windows manager (DWM). For example, when the desktop windows manager is off, the graphics module may construct the frame in a dedicated memory block to be shown on the physical display 101. Construction of the display data frame may be based on the detection of a new render request through, for example "present( )" or "flip( )" for the surfaces on both emulated physical displays. For cases where the desktop windows manager is on, the graphics module 201 may report the synchronization signal (Vsync) to the operating system for both the virtual displays. When flip requests come in for the DWM on, or for full screen mode, for either one of the virtual display areas (that is, the emulated physical displays) the graphics module 201 performs a composition from the frames of the emulated physical displays into one frame of the swap chain and shows the newly constructed frame on the physical display 101.

The various embodiments are transparent to applications in that the graphics module 201 guarantees application independency for the virtual display areas and retains the state regardless of any configuration change from various applications that may be running within the various virtual display areas. In order to maintain consistency and stability of the user experience, graphics module 201 takes actions as needed in the case of configuration changes on the various virtual display areas made by the user. For example relocation of the desktop or changes of resolution on the display are handled by the graphics module 201.

Figure 7:
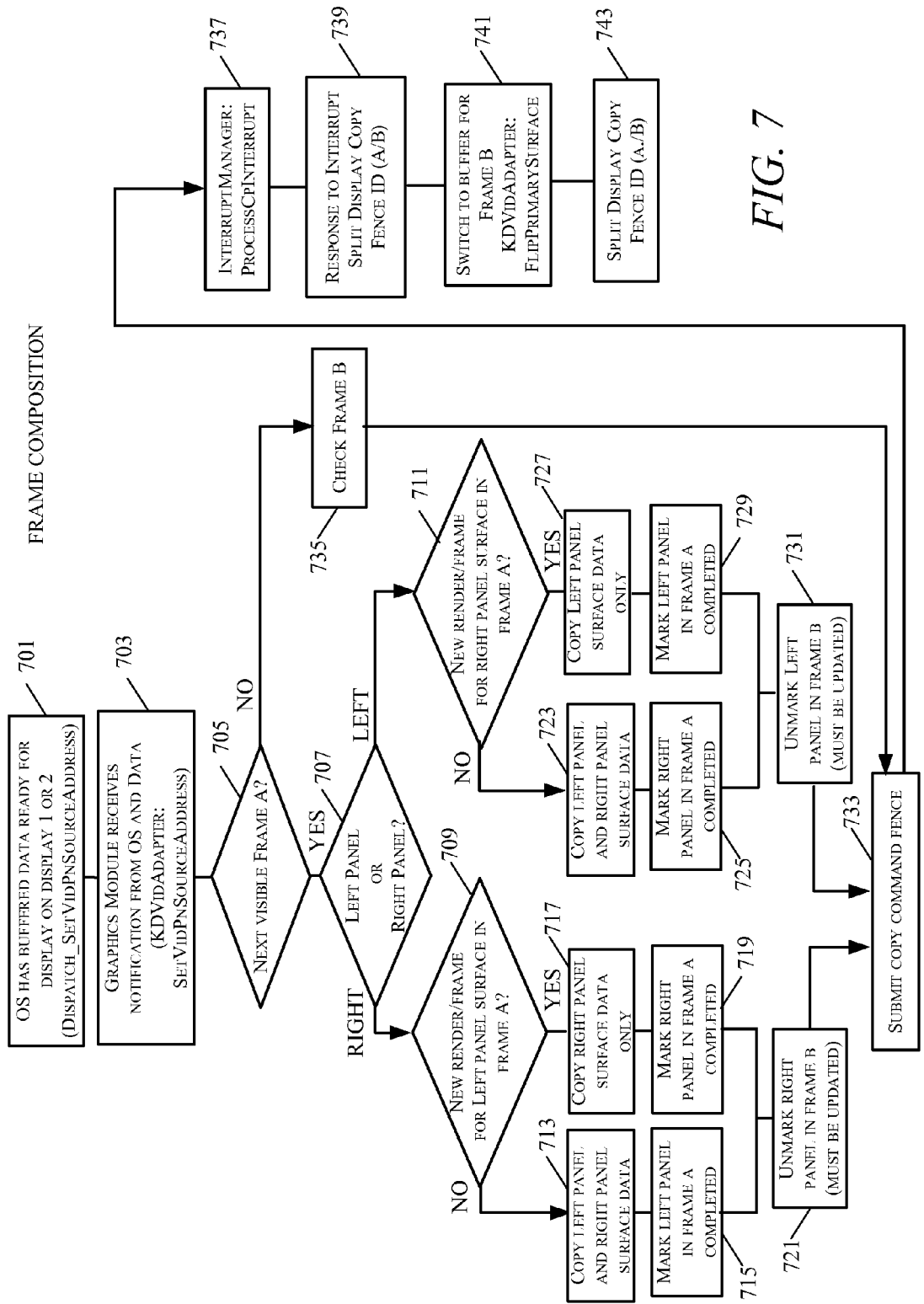
FIG. 7 is a flow chart illustrating frame composition in a manner which presents image tearing, in accordance with an embodiment.

Turning to FIG. 7, a frame composition method in accordance with the embodiments is illustrated. The frame composition method is essentially a double buffering operation modified for the particular necessities of the virtual display areas. For example in block 701, the operating system has buffer data ready to be displayed on one of the virtual display areas and in block 703 the graphics module receives notification from the operating system that this is the case. The double buffering scheme divides the physical display frame buffer 223 into two portions, frame A and frame B. Therefore if the next visible frame to be displayed is frame A as shown in block 705, a determination of whether the left panel or right panel is ready to be displayed is determined in block 707. The two sides of the flowchart extending from block 707 are symmetrical, in that if a new render frame is present for one of the virtual display areas, then the opposite or other virtual display area surface data is copied and the frame is flagged completed with respect to that particular virtual display area.

Figure 8:
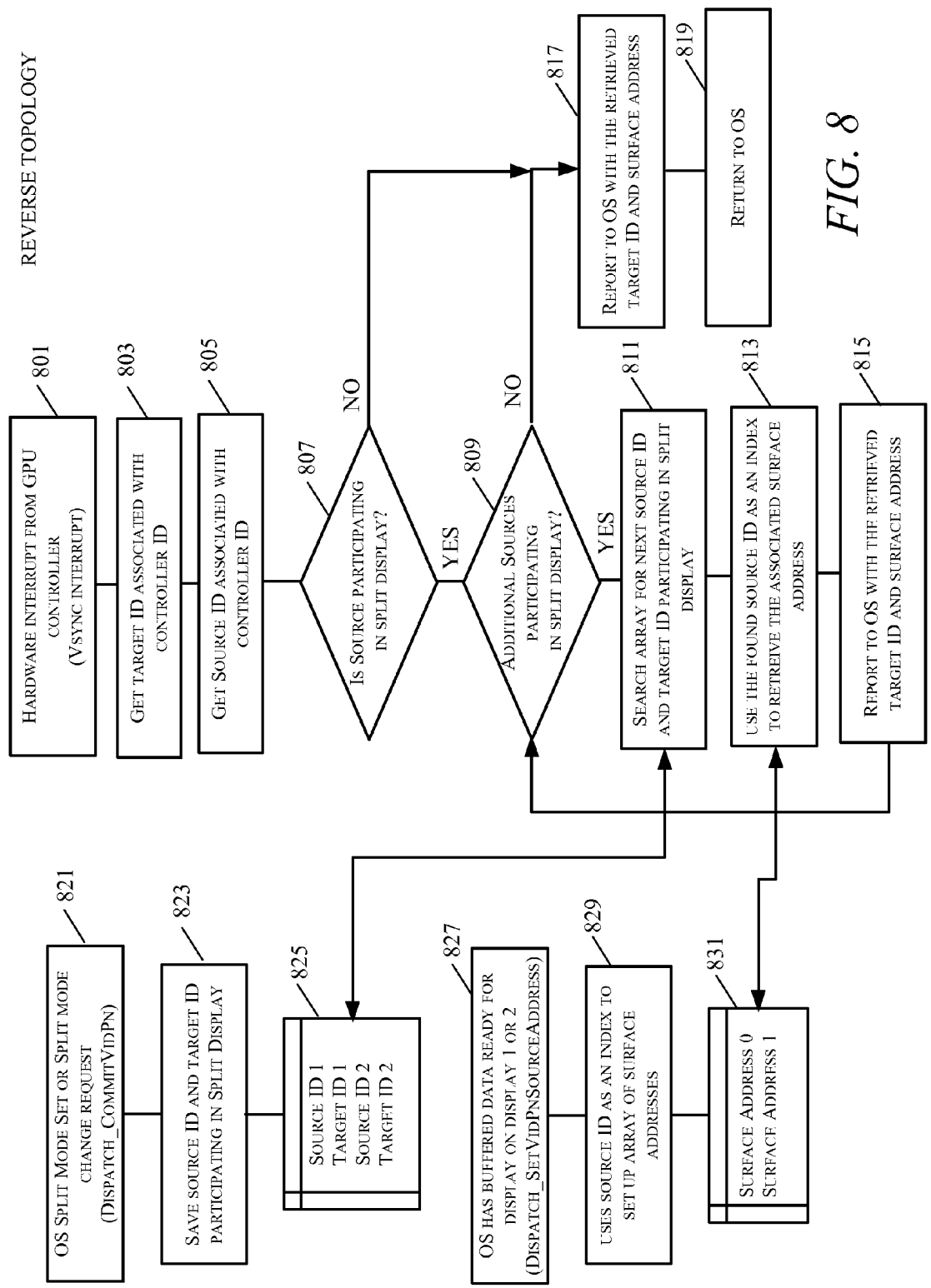
FIG. 8 is a flow chart illustrating the handling of hardware interrupts and simulation of hardware interrupts for the virtual displays, in accordance with an embodiment.

For example if the new render frame is present for the right panel surface in frame A as shown in block 711, then the left panel surface data is copied only as shown in block 727. The buffer is then marked completed with respect to the left panel information in frame A as shown in block 729. The frame B is unmarked with respect to the left panel as it must be updated as shown in block 731. The method then proceeds to blocks 733 through 743 where the interrupt is responded to with respect to the operating system 207. If the new render frame is not present for the right panel surface in frame A as shown in block 711., then the left panel and right panel surface data are copied as shown in block 723. The buffer is then marked completed with respect to the right panel information in frame A as shown in block 725. Similarly, if the new render frame is present for the left panel surface in frame A as shown in block 709, then the right panel surface data is copied only as shown in block 717. The buffer is then marked completed with respect to the right panel information in frame A as shown in block 719. The frame B is unmarked with respect to the right panel as it must be updated as shown in block 721. The method then proceeds to blocks 733 through 743 where the interrupt is responded to with respect to the operating system 207. If the new render frame is not present for the left panel surface in frame A as shown in block 709, then the left panel and right panel surface data are copied as shown in block 713. The buffer is then marked completed with respect to the left panel information in frame A as shown in block 715. FIG. 8 illustrates the handling of hardware interrupts and the simulation of hardware interrupts for the emulated physical displays in accordance with the embodiment. This for example the GPU 215 may send a hardware interrupt as shown in 801. This may be a Vsync interrupt in some embodiments as indicated. The graphics module 201 will, as shown in block 803, get the target ID associated with the controller ID of the GPU. The graphics module 201 will then get the source ID associated with the controller ID as shown in block 805 and will determine in block 807 if that particular source is participating in the split display mode. If not, then the graphics module 201 will report to the OS with the retrieved target ID and the surface addresses shown in block 817 and will return control to the OS in block 819.

If the source in block 807 is participating in the split display mode, then the graphics module 201 checks if any additional sources are participating in the split display mode as shown in block 809. If yes, then the graphics module will search an array, such as array 825, for the next source ID and target ID participating in the split display as shown in block 811. The array 825 for example may populate after an OS split mode set or split mode change request as shown in block 821, followed by saving a source ID and target ID participating in the split display as shown in block 823. The graphics module will then use the found source ID as an index to retrieve the associated surface address as shown in block 813. The surface address may be obtained from for example the table 831 which may be stored in the system memory. The table 831 for example may populate after the OS has buffered data ready for display on display 1 or 2 as shown in block 827, followed by using a source ID as an index to set up an array of surface addresses as shown in block 829. The graphics module will then report to the OS with the retrieved target ID and the surface addresses shown in block 815. When all of the sources participating in the split display have been determined by box 809, the graphics module 201 reports to the operating system as shown in boxes 817 and 819. Therefore the graphics module 201 simulates interrupts for the emulated physical displays to the operating system so that the operating system will not inadvertently conclude that the hardware is not properly working and inadvertently place GPU 215 into a reset mode. It is to be understood in FIG. 8 that the target ID may be considered a monitor ID that is an ID that corresponds to a physical display. Therefore the graphics module 201 must simulate the target ID with respect to the virtual display areas such that the operating system perceives the virtual display areas as separate physical displays. The source ID corresponds to the virtual display area or virtual desktop such as virtual display area 109 and 111.

Figure 9:
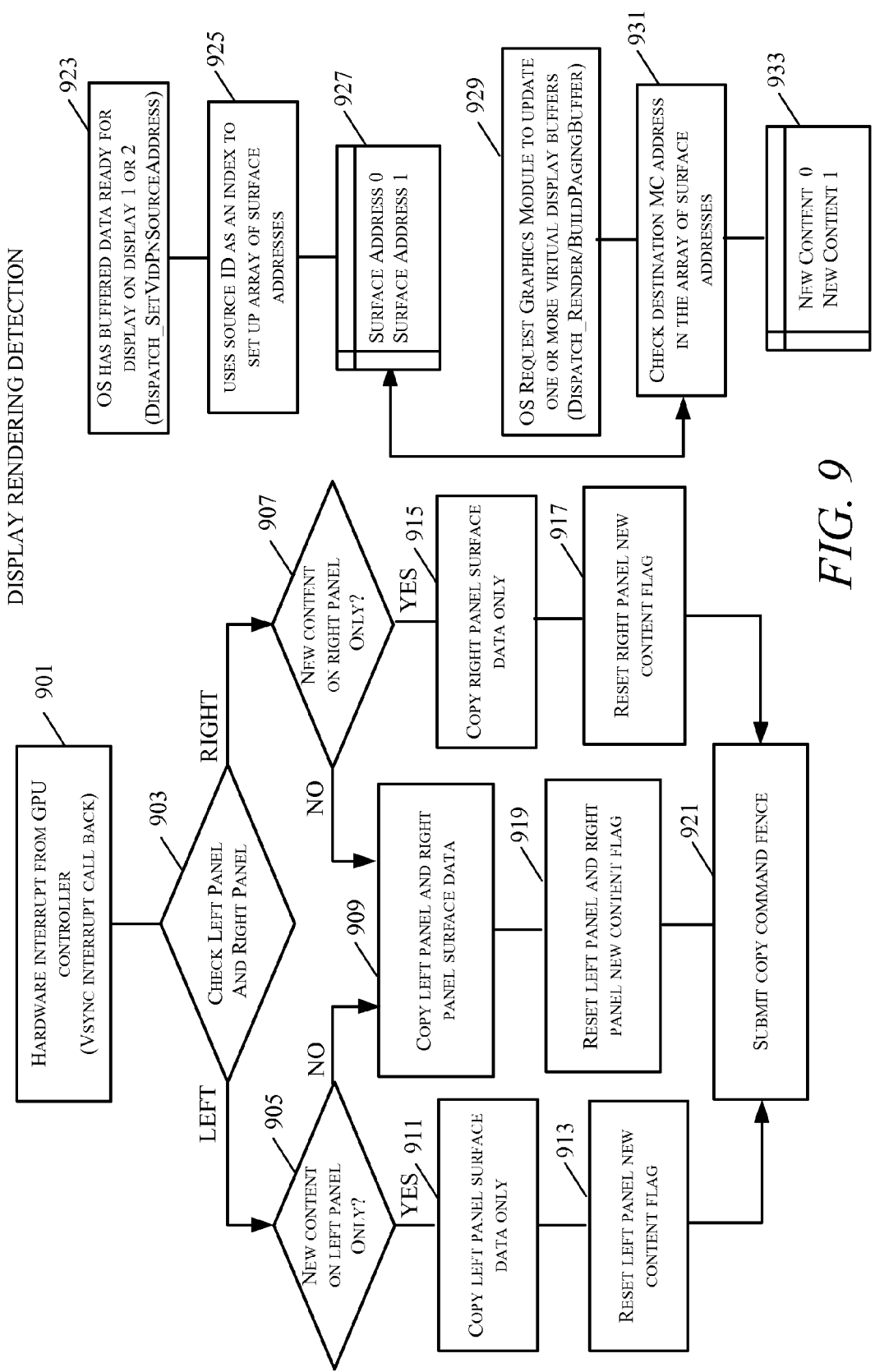
FIG. 9 is a flow chart illustrating the handling of hardware interrupts and virtual display updates, in accordance with an embodiment.

FIG. 9 illustrates the handling of composition when desktop windows manager (DWM) is not running Graphics module 201 creates a call back 901 with GPU 215 through hardware interrupts such as the Vsync interrupt callback. In this case, when an interrupt occurs, graphic module 201 will check both new content states of both virtual display areas in 903. If there is a change on both of the virtual display areas 909, graphic module 201 copies both virtual display areas into a first display frame A in the physical display frame buffer 223 and resets a new content flag for both virtual display areas as shown in block 919. The method then proceeds to block 921 where the interrupt is responded to with respect to the operating system. If there is a change on either of the virtual display areas 909, graphic module 201 copies only that particular virtual display area into the first display frame A in physical display frame buffer 223 and resets a new content flag for that particular virtual display area, as shown in blocks 905 and 907, blocks 911 and 915, and blocks 913 and 917. However the graphics module does not need to report any information back to the operating system 207. When the OS has buffered data ready for display on display 1 or 2 as shown in block 923, an array of surface addresses, such as the one shown in block 927, is formed by using a source ID as an index, as shown in block 925. When the OS requests the graphics module to update one or more virtual display buffers, the array of surface addresses, such as the one shown in block 927, is checked for a destination MC address. The method proceeds to set up an array of new content, for example block 933.

Figure 10:
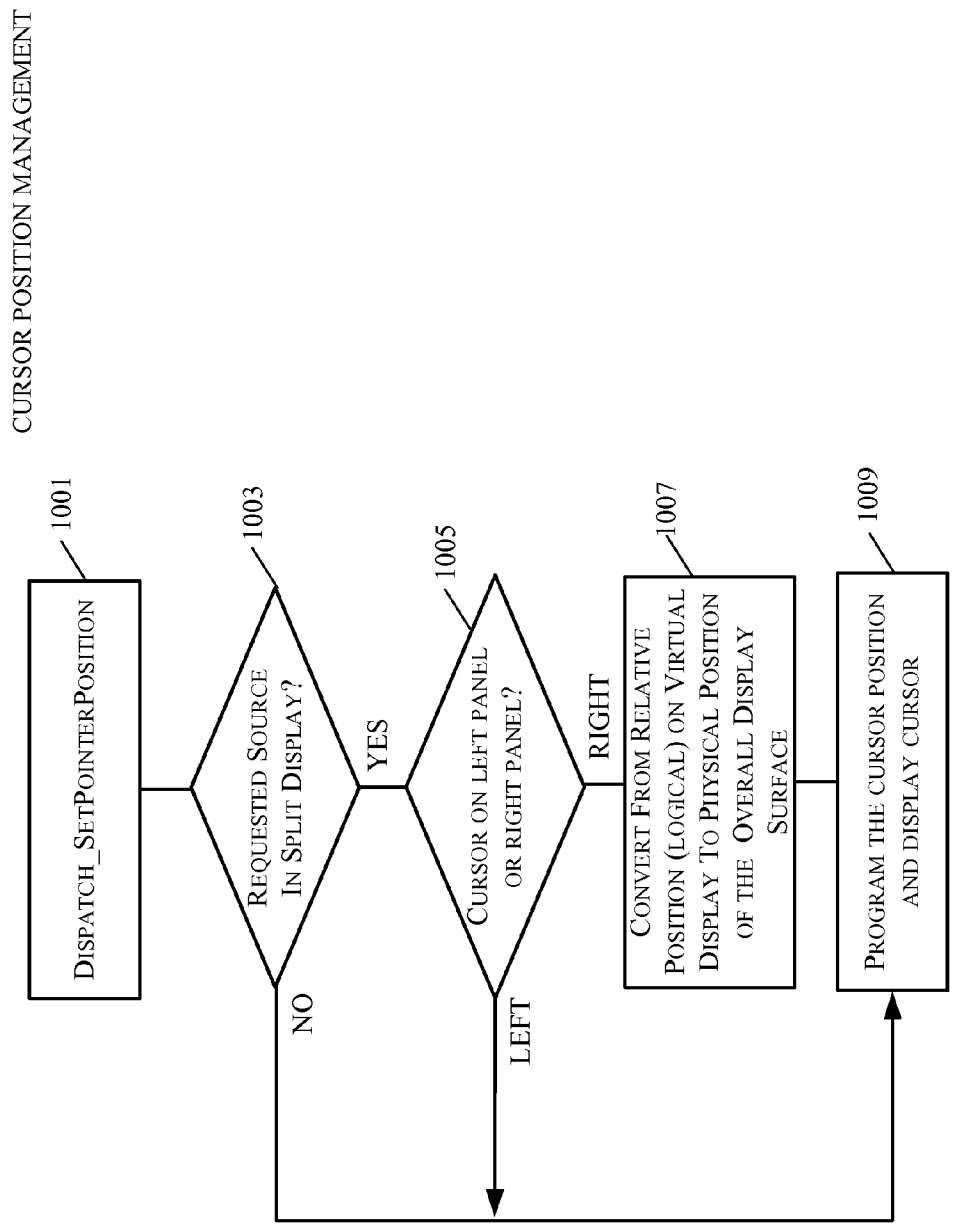
FIG. 10 is a flow chart illustrating the handling of the cursor as it moves between various virtual display partitions in accordance with the embodiments.

FIG. 10 illustrates a method of cursor management corresponding to, for example, the scenario illustrated by FIG. 5 where the cursor 105 moves across the virtual display area boundary 107. In this case the graphics module 201 determines whether the cursor is on the left panel or right panel, that is, the graphics module 201 determines what virtual display the mouse cursor is present on as shown in blocks 1001-1005. The position of the mouse cursor is converted from the relative position on the virtual display areas to the physical display position corresponding to the physical display visible surface 100 of the overall physical display 101 as shown in block 1007. This information is then provided to the GPU 215 as shown in block 1009.

FIGS. 11-13 summarize operation of the various embodiments. As shown in FIG. 11, block 1101, a single physical display's viewable area may be partitioned into at least two virtual viewable areas. The graphics module 201 of the various embodiments may then emulate the virtual viewable areas as physical displays with respect to the operating system 207 as shown in block 1103. FIG. 12 shows that the system 200 may include the configuration user interface 203. Therefore in block 1201, a user interface 203 may be provided for configuration of the virtual displays. In block 1203 the graphics module 201 may receive user selection input for a display arrangement via the logical interface 205 from the configuration user interface 203. As shown in block 1205, the graphics module 201 will map the virtual display data to physical display 101 on the hardware interface between the graphics module 201 and the GPU 215. As shown in block 1207, the graphics module 201 will map the operating system physical display data to virtual display sections. The graphics module 201 will then handle image movement across the virtual display sections as shown in block 1209. FIG. 13 illustrates operation of the virtual display areas when an application is shown in full screen mode. In block 1301 a first application may be displayed in full screen mode within a first virtual viewable area. Access is provided to a second application in a second virtual viewable area while the first application is displayed in full screen mode within the first virtual viewable area as shown in block 1302.

Figure 14:
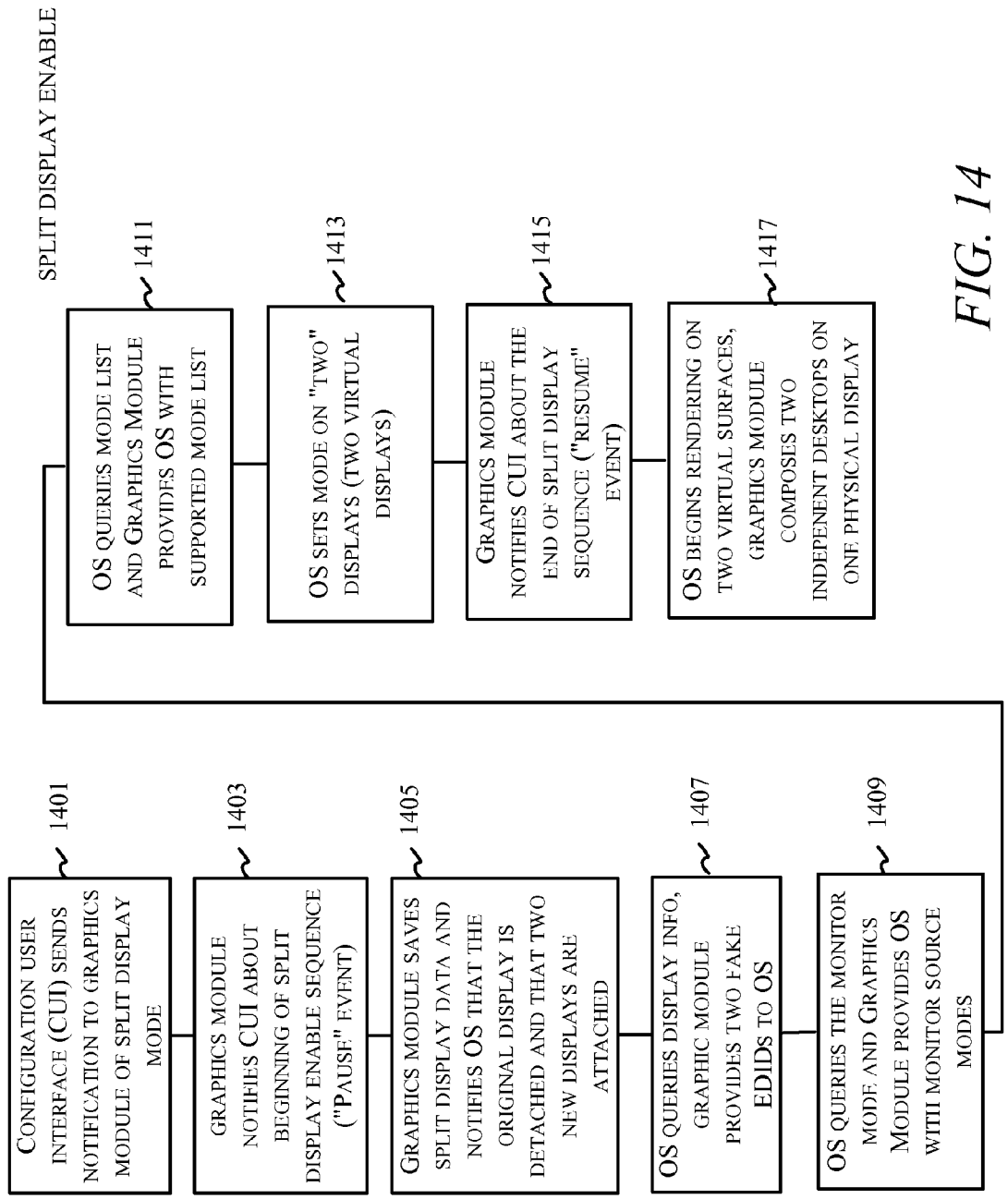
FIG. 14 is a flow chart illustrating enabling of a split display having a plurality of virtual partitions in accordance with the various embodiments.
Figure 15:
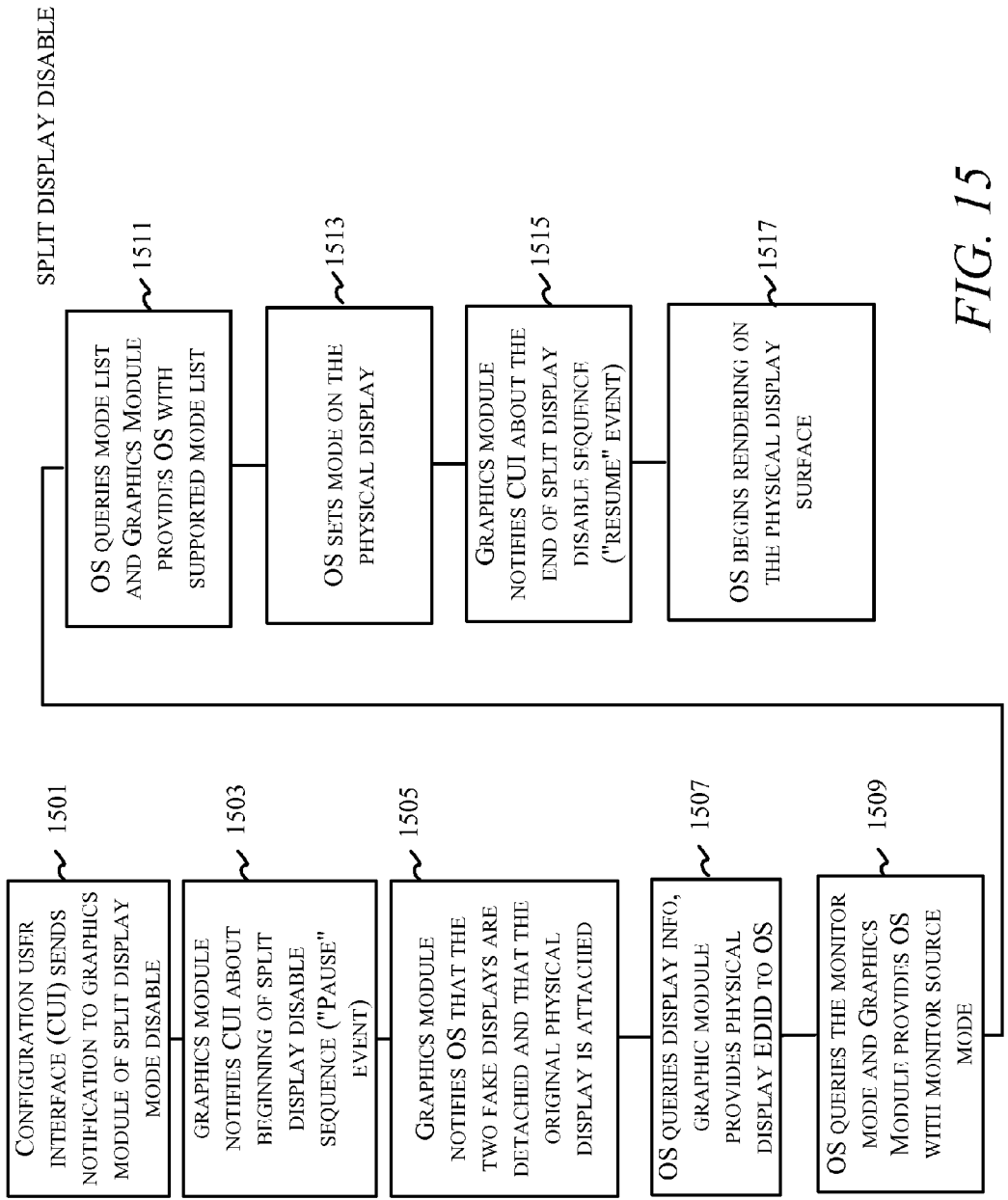
FIG. 15 is a flow chart illustrating disabling of a split display in accordance with the various embodiments.

FIGS. 14 and 15 are flowcharts illustrating further operation of the configuration user interface 203 and illustrate the enablement and disablement of split display mode on the physical display 101. In block 1401 the configuration user interface 203 may send a notification to the graphics module 201 that the user wishes to enter split display mode. In block 1403 the graphics module 201 notifies the configuration user interface 203 of the beginning of the split display enable sequence. This may be accomplished by using for example, a "pause" event. In block 1405 the graphics module 203 saves the split display data and notifies the operating system 207 that the original display, that is physical display 101, is detached and that two new displays are now attached. The two new displays are the emulated physical displays which are actually the virtual display areas 109 and 111 shown in FIG. 1 in physical display 101. The operating system then queries for display info as shown in block 1407, and the graphics module 201 generates and provides two fake EDIDs to the operating system 207. The operating system 207 then queries the monitor mode and graphics module 201 provides the operating system 207 with monitor source modes as shown in block 1409. In block 1411 the operating system 207 queries the mode list and the graphics module 201 provides the operating system 207 with the supported mode list. In block 1413 the operating system 207 sets the mode on two displays, that is, corresponding to the two emulated physical displays corresponding to the two virtual display areas 109 and 111. In block 1415 the graphics module 201 notifies the configuration user interface 203 about the end of the split display sequence using for example a "resume" event. In block 1417 the operating system 207 begins rendering on the two virtual display areas and the graphics module 201 composes two independent desktops on the single physical display 101. FIG. 15 is another flow chart which shows the operation of split mode disable. After the graphics module 201 receives notification to disable the split display mode in block 1501, it notifies the configuration user interface 203 about beginning of the split display disable sequence in block 1503. The graphics module 201 disables the split display mode by notifying the operating system 207 that the two fake displays, that is, the two emulated physical displays corresponding to the two fake EDIDs, are detached and that the original physical display 101 is now attached as shown in block 1505. The graphics module 201 provides the operating system 207 with the information needed as shown in blocks 1507 through 1515, so that the operating system may begin rendering again on the physical display 101 physical display visible surface 100 as shown in block 1517.

Figure 16:
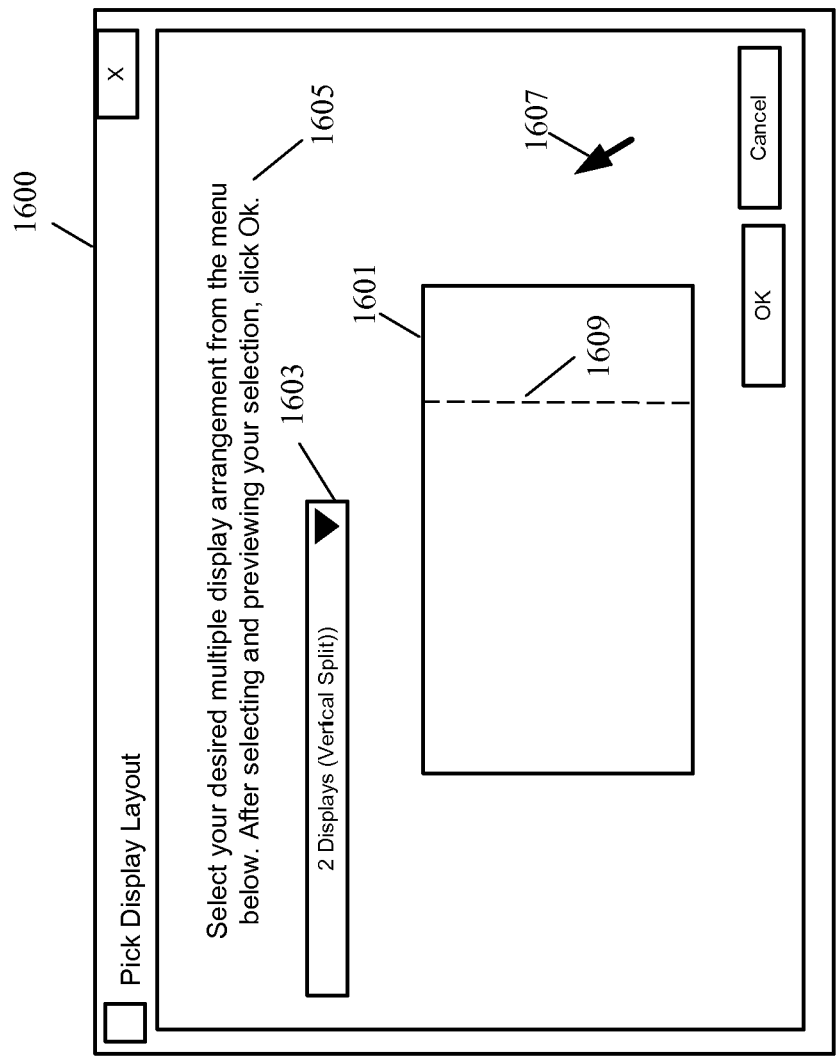
FIG. 16 is an example of a split display configuration application window in accordance with an embodiment.

Therefore in accordance with the various embodiments a graphics module 201, which in some embodiments may be implemented as a kernel mode driver, provides an interface between an operating system 207 and a graphics processing unit 215 (and related graphics hardware such as the chipset, etc.) such that the operating system 207 perceives operation of multiple physical displays where the graphics processing unit and associated graphics hardware perceives only a single physical display with respect to its specific operations. A physical display may thereby be partitioned into various virtual display areas as described above. FIG. 16 shows an example application window which may be used as part of the configuration user interface 203. The application window 1600 instructs a user to select a desired multiple display arrangement as shown in block 1605 and allows a user to pick a display layout by, for example, a pull down menu 1603. The configuration user interface 203 application window 1600 may provide a visual image of the physical display visible surface 1601 and show the selected virtual display area partition such as, for example, physical display area partition boundary 1609. The user may then use the cursor 1607 to click OK and enter into the split display mode as was described with respect to block 1401 in FIG. 14 where the configuration user interface 203 sends notification of split display mode to the graphics module 201. Therefore the action illustrated by block 1401 of FIG. 14 may be the result of user action within the application window 1600 of the configuration user interface 203.

Figure 17:
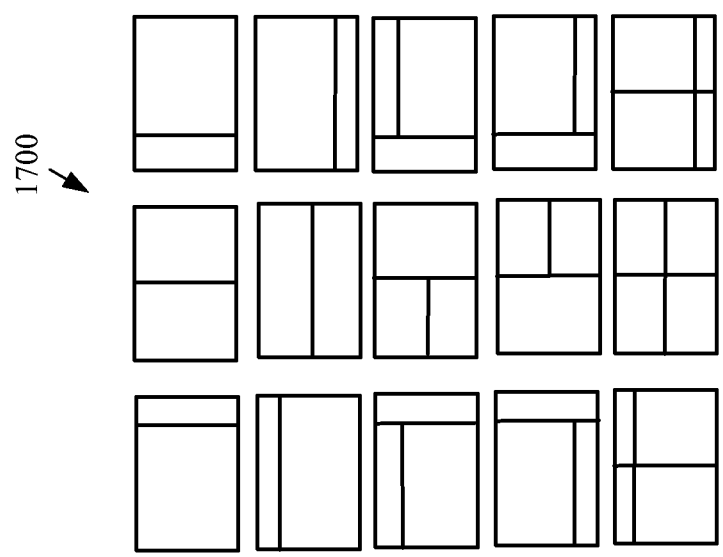
FIG. 17 is a chart of exemplary display configurations, which may be provided in a menu of a split display configuration application window in accordance with an embodiment.

The application window 1600 is a simplified exemplary application window for the purpose of explaining a possible user interface. However the application window 1600 is to be understood as exemplary only and therefore various other layouts and configurations of the application window 1600 may be used within the various embodiments as would be understood. For example the pull down menu 1603 may provide text descriptions of the configurations of the physical display viewable area, however the pull down menu may also provide symbols of configuration types as illustrated by the configuration types 1700 illustrated in FIG. 17. As illustrated in FIG. 17, the various configuration types 1700 may be provided as part of the pull down menu 1603 of application window 1600. Therefore a user may simply select the pull down menu and select an appropriate configuration from the configuration choices of configuration types 1700. Of course, the configuration types 1700 are not to be considered an all-inclusive set, but rather are to be considered as illustrative only of some possible configurations that may be used by the various embodiments. That is, while the example configuration types 1700 shown in FIG. 17 show a maximum of four virtual display areas, there may be many more virtual display areas greater than four. Furthermore, the virtual display areas shown in FIG. 17 are defined by vertical and horizontal position boundaries. However, the virtual display areas need not be defined simply by horizontal or vertical boundaries, but may be defined by various geometric shapes and patterns such as but not limited to, triangular, rectangular, circular or other shaped virtual display area boundary patterns.

Therefore apparatuses and methods of operation for partitioning a display surface into a plurality of virtual display areas have been disclosed herein. Other variations that would be equivalent to the herein disclosed embodiments may occur to those of ordinary skill in the art and would remain in accordance with the scope of embodiments as defined herein by the following claims.

What is claimed is:

1. A method comprising:
   partitioning a single display's viewable area into at least two defined virtual viewable areas; and
   emulating the at least two virtual viewable areas as at least two emulated physical displays by providing information pertinent to each of at least the two emulated physical displays to an operating system such that the operating system behaves as if interfacing with two actual physical displays.

2. The method of claim 1, wherein emulating the at least two virtual viewable areas as at least two emulated physical displays comprises:
   providing to said operating system, generated display identification data for each of the at least two emulated physical displays in response to a query from said operating system for display information.

3. The method of claim 1, wherein emulating the at least two virtual viewable areas as at least two emulated physical displays comprises:
   receiving notification of an interrupt from a graphics processing unit wherein said interrupt corresponds to said single display; and
   reporting to said operating system with at least two sets of interrupt reporting information, corresponding to said at least two emulated physical displays, as if two interrupts were received.

4. The method of claim 1, comprising:
   displaying a first application window in full screen mode within one virtual viewable area of said at least two virtual viewable areas, wherein said application window in said full screen mode expands only within a perimeter of said one virtual viewable area.

5. The method of claim 4, comprising:
   display a second application window within another virtual viewable area of said at least two virtual viewable areas, while said first application window is displayed in said full screen mode within said one virtual viewable area; and
   continuing to display said first application window in said full screen mode while said second application window is in focus.

6. The method of claim 1, comprising:
   composing display data frames wherein each data frame includes data from both of said at least two virtual viewable areas; and
   sending said display data frames to said single display.

7. The method of claim 6, comprising:
   determining that display data displayed within a first virtual viewable area of said at least two virtual viewable areas has changed; and
   copying display data from a second virtual viewable area of said at least two virtual viewable areas in a first display data frame.

8. The method of claim 1, comprising:
   receiving selection input corresponding to a display configuration that partitions said single display's viewable area into said at least two virtual viewable areas; and
   wherein partitioning a single display's viewable area into at least two virtual viewable areas is in response to said selection input.

9. The method of claim 1, wherein emulating the at least two virtual viewable areas as at least two emulated physical displays comprises:
   receiving notification from said operating system, of buffered data ready for display on one of said at least two emulated physical displays;
   determining that display data on a first emulated physicals display of said at least two emulated physical displays has changed;
   copying display data for a second emulated physical display of said at least two emulated physical displays into a first data frame, wherein display data for said second emulated physical display did not change and wherein said display data for said second emulated physical display is not present in said first data frame, and setting a flag as completed in said first data frame for said first and second emulated physical display; and setting a flag as not completed for said first emulated physical display in a second data frame.

10. The method of claim 1, wherein emulating the at least two virtual viewable areas as at least two emulated physical displays comprises:

receiving notification from said operating system, of buffered data ready for display on one of said at least two emulated physical displays;

determining that display data on a first emulated physical display of said at least two emulated physical displays has not changed and is not present in a second data frame;

copying display data for both said first emulated physical display, and a second emulated physical display, wherein display data for said second emulated physical display did change, copying said display data for both first and second emulated physical displays into said second data frame and setting a flag as completed in said second data frame for said first and second emulated physical display; and setting a flag as not completed for said second emulated physical display in a first data frame.

11. The method of claim 1, wherein emulating the at least two virtual viewable areas as at least two emulated physical displays comprises:

receiving notification from said operating system, of buffered data ready for display on one of said at least two emulated physical displays;

determining that display data on a first emulated physical display of said at least two emulated physical displays has changed, and that second display data from a second emulated physical display has not changed and is present in a first data frame;

copying display data for said first emulated physical display into said first data frame and setting a flag as completed in said first data frame for said first emulated physical display; and setting a flag as not completed for said first emulated physical display in a second data frame.

12. The method of claim 1, wherein emulating the at least two virtual viewable areas as at least two emulated physical displays comprises:

receiving an interrupt corresponding to a cursor position;

determining an emulated physical display of said at least two emulated physical displays upon which said cursor is located; and converting said cursor's relative position, relative to said emulated physical display upon which said cursor is located, to a physical position corresponding to an overall display surface of said single display.

13. An apparatus comprising:

at least one programmable processor; and memory operatively coupled to said programmable processor, wherein said memory contains executable instructions for execution by said at least one processor, wherein said at least one programmable processor, upon executing said executable instructions is operable to:

partition a single display's viewable area into at least two defined virtual viewable areas; and emulate the at least two virtual viewable areas as at least two emulated physical displays by providing information pertinent to each of at least the two emulated physical displays to an operating system such that the operating system behaves as if interfacing with two actual physical displays.

14. The apparatus of claim 13, wherein said at least one programmable processor, upon executing said executable instructions is operable to:

emulate the at least two virtual viewable areas as at least two emulated physical displays by providing to said operating system, generated display identification data for each of the at least two emulated physical displays in response to a query from said operating system for display information.

15. The apparatus of claim 13, wherein said at least one programmable processor, upon executing said executable instructions is operable to emulate the at least two virtual viewable areas as at least two emulated physical displays by:

receiving notification of an interrupt from a graphics processing unit wherein said interrupt corresponds to said single display; and reporting to said operating system with at least two sets of interrupt reporting information, corresponding to said at least two emulated physical displays, as if two interrupts were received.

16. The apparatus of claim 13, further comprising:

a display operatively coupled to said at least one processor, wherein said display is operable to display a first application window in full screen mode within one virtual viewable area of said at least two virtual viewable areas, wherein said application window in said full screen mode expands only within a perimeter of said one virtual viewable area.

17. The apparatus of claim 16, wherein said display is operable to:

display at least a second application window within another virtual viewable area of said at least two virtual viewable areas, while said first application window is displayed in said full screen mode within said one virtual viewable area.

18. The apparatus of claim 13, wherein said at least one programmable processor, upon executing said executable instructions is operable to:

compose display data frames wherein each data frame includes data from both of said at least two virtual viewable areas; and send said display data frames to said single display.

19. The apparatus of claim 18, wherein said at least one programmable processor, upon executing said executable instructions is operable to:

determine that display data displayed within a first virtual viewable area of said at least two virtual viewable areas has changed; and copy display data from a second virtual viewable area of said at least two virtual viewable areas in a first display data frame.

20. The apparatus of claim 13, wherein said at least one programmable processor, upon executing said executable instructions is operable to:

receive selection input corresponding to a display configuration that partitions said single display's viewable area into said at least two virtual viewable areas; and wherein partitioning a single display's viewable area into at least two virtual viewable areas is in response to said selection input.

21. The apparatus of claim 13, wherein said at least one programmable processor, upon executing said executable instructions is operable to emulate the at least two virtual viewable areas as at least two emulated physical displays by:

receiving notification from said operating system, of buffered data ready for display on one of said at least two emulated physical displays;

determining that display data on a first emulated physicals display of said at least two emulated physical displays has changed;
copying display data for a second emulated physical display of said at least two emulated physical displays into a first data frame, wherein display data for said second emulated physical display did not change and wherein display data for said second emulated physical display is not present in said first data frame, and setting a flag as completed in said first and second data frame for said second emulated physical display; and
setting a flag as not completed for said first emulated physical display in a second data frame.

22. The apparatus of claim 13, wherein said at least one programmable processor, upon executing said executable instructions is operable to emulate the at least two virtual viewable areas as at least two emulated physical displays by:
receiving notification from said operating system, of buffered data ready for display on one of said at least two emulated physical displays;
determining that display data on a first emulated physical display of said at least two emulated physical displays has not changed and is not present in a second data frame of a first and second data frame;
copying display data for both said first emulated physical display, and a second emulated physical display, wherein display data for said second emulated physical display did change, copying said display data for both first and second emulated physical displays into said second data frame and setting a flag as completed in said second data frame for said first and second emulated physical display; and
setting a flag as not completed for said second emulated physical display in a first data frame.

23. The apparatus of claim 13, wherein said at least one programmable processor, upon executing said executable instructions is operable to emulate the at least two virtual viewable areas as at least two emulated physical displays by:
receiving notification from said operating system, of buffered data ready for display on one of said at least two emulated physical displays;
determining that display data on a first emulated physical display of said at least two emulated physical displays has changed, and that second display data from a second emulated physical display has not changed and is present in a first data frame;
copying display data for said first emulated physical display into said first data frame and setting a flag as completed in said first data frame for said first emulated physical display; and
setting a flag as not completed for said first emulated physical display in a second data frame.

24. The apparatus of claim 13, wherein said at least one programmable processor, upon executing said executable instructions is operable to emulate the at least two virtual viewable areas as at least two emulated physical displays by:
receiving a notification corresponding to a cursor position;
determining an emulated physical display of said at least two emulated physical displays upon which said cursor is located; and
converting said cursor's relative position, relative to said emulated physical display upon which said cursor is located, to a physical position corresponding to an overall display surface of said single display.

25. A computer readable memory comprising:
executable instructions for execution by at least one processor, that when executed cause said at least one processor to:
partition a single display's viewable area into at least two defined virtual viewable areas; and
emulate the at least two virtual viewable areas as at least two emulated physical displays by providing information pertinent to each of at least the two emulated physical displays to an operating system such that the operating system behaves as if interfacing with two actual physical displays.

26. The computer readable memory of claim 25, wherein said executable instructions, when executed further cause the one or more processors to:
emulate the at least two virtual viewable areas as at least two emulated physical displays by providing to said operating system, generated display identification data for each of the at least two emulated physical displays in response to a query from said operating system for display information.

27. The computer readable memory of claim 25, wherein said executable instructions, when executed further cause the one or more processors to emulate the at least two virtual viewable areas as at least two emulated physical displays by:
receiving notification of an interrupt from a graphics processing unit wherein said interrupt corresponds to said single display; and
reporting to said operating system with at least two sets of interrupt reporting information, corresponding to said at least two emulated physical displays, as if two interrupts were received.

28. The computer readable memory of claim 25, wherein said executable instructions, when executed further cause the one or more processors to:
display a first application window in full screen mode within one virtual viewable area of said at least two virtual viewable areas on a display, wherein said application in said full screen mode expands only within a perimeter of said one virtual viewable area.

29. The computer readable memory of claim 28, wherein said executable instructions, when executed further cause the one or more processors to:
display a second application window within another virtual viewable area of said at least two virtual viewable areas on said display, while said first application window is displayed in said full screen mode within said one virtual viewable area.

30. The computer readable memory of claim 25, wherein said executable instructions, when executed further cause the one or more processors to:
receive selection input corresponding to a display configuration that partitions said single display's viewable area into said at least two virtual viewable areas; and
wherein partitioning a single display's viewable area into at least two virtual viewable areas is in response to said selection input.

* * * * *